Figure 1:
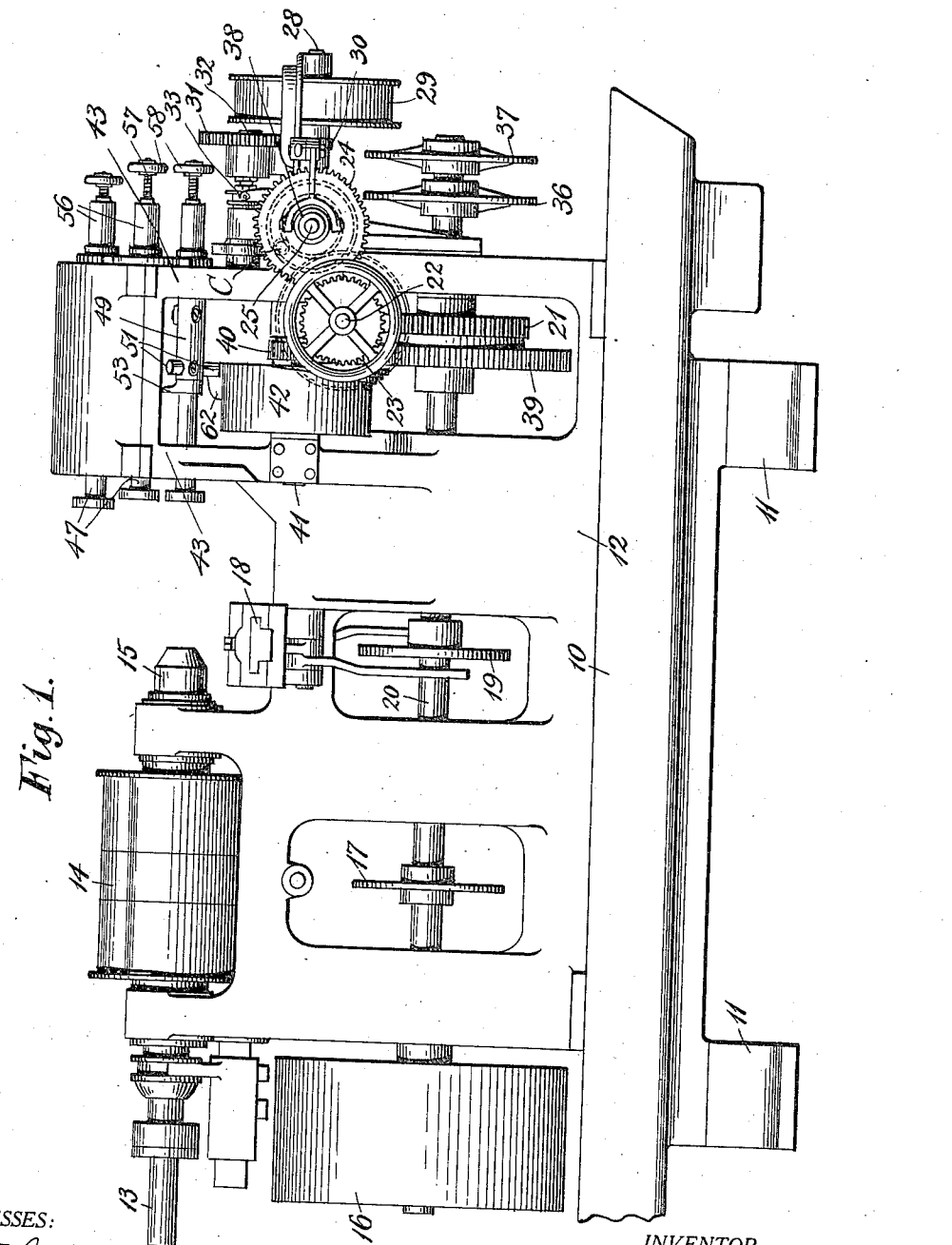

W. B. PEARSON.
METAL WORKING MACHINE.
APPLICATION FILED APR. 8, 1908.

1,060,119.

Patented Apr. 29, 1913.

2 SHEETS—SHEET 1.

WITNESSES:
Chas. F. Schmelz
L. E. Berkovitch

INVENTOR.
W. B. Pearson,
BY
Arthur B. Jenkins,
ATTORNEY.

W. B. PEARSON.
METAL WORKING MACHINE.
APPLICATION FILED APR. 8, 1908.
1,060,119.
Patented Apr. 29, 1913.
2 SHEETS—SHEET 2.
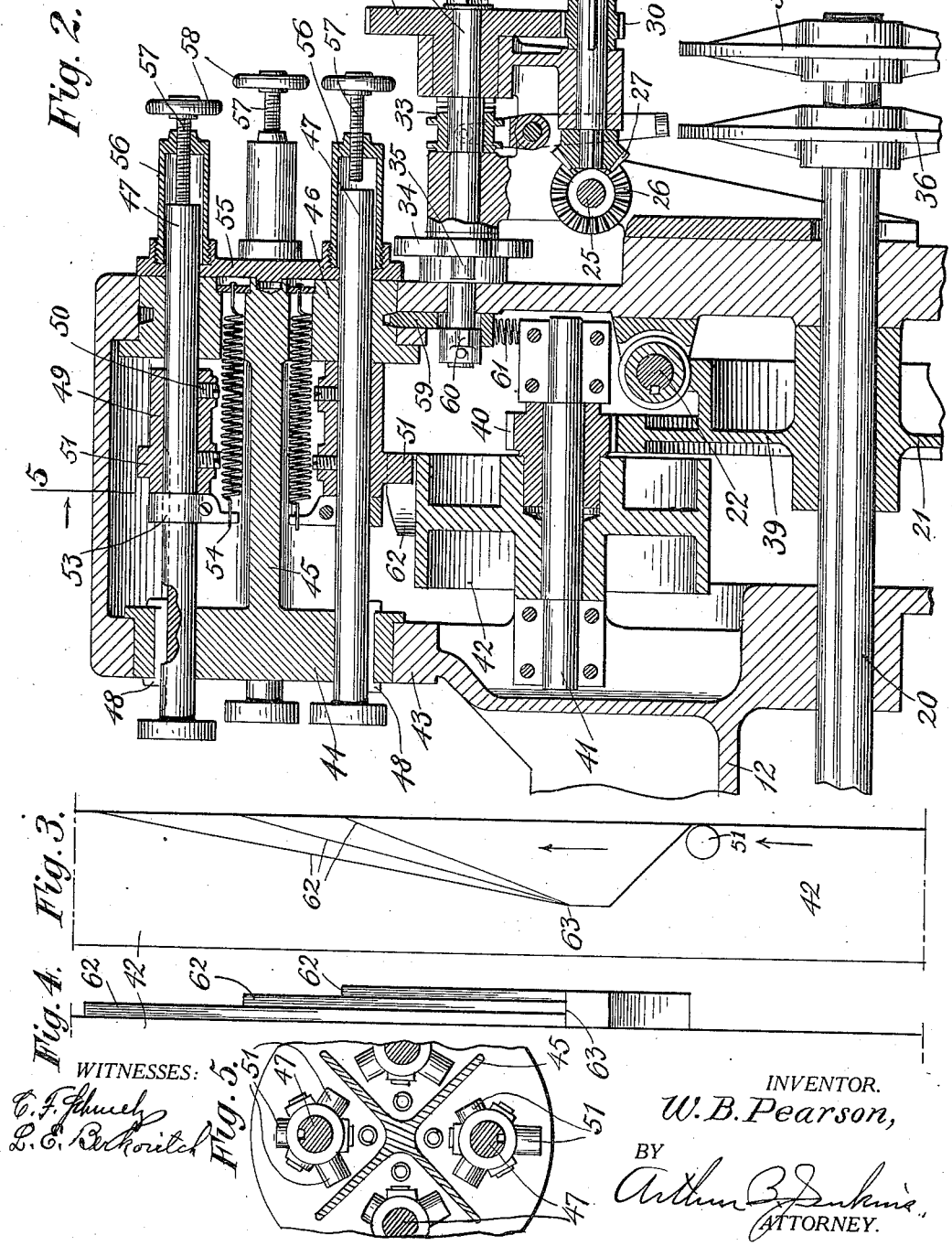
WITNESSES:
INVENTOR.
W. B. Pearson,
BY
ATTORNEY.

UNITED STATES PATENT OFFICE.

WALTER B. PEARSON, OF CHICAGO, ILLINOIS.

METAL-WORKING MACHINE.

1,060,119. Specification of Letters Patent. Patented Apr. 29, 1913.

Application filed April 8, 1908. Serial No. 425,828.

*To all whom it may concern:*

Be it known that I, WALTER B. PEARSON, a citizen of the United States, and a resident of Chicago, in the county of Cook and State of Illinois, have invented a new and useful Improvement in Metal-Working Machines, of which the following is a specification.

The invention relates to the class of machines used in the production of articles by turning, boring, threading and like operations, which machines are to some extent at least, if not wholly, automatic in their action, and the object, among others, of the invention is the production of such a machine having numerous and various novel features of advantage and utility.

One form of machine containing my invention and embodying in its construction the objects sought is illustrated in the accompanying drawings, in which—

Figure 1 is a view in side elevation of a machine embodying my invention, the general arrangement of the parts being shown rather than the specific and certain parts being omitted for the sake of clearness. Fig. 2 is a detail view on enlarged scale in vertical longitudinal section through a portion of the turret end of the machine, the line of section passing through the axis of the turret and driving shaft. Fig. 3 is a diagrammatic view illustrating a development of the cam for actuating the tool spindle, the view being in plan. Fig. 4 is an edge view of the same. Fig. 5 is a detail view in cross-section through a portion of the turret on plane denoted by line 5 of Fig. 2 showing the construction of parts.

In the accompanying drawings the numeral 10 denotes the table of a machine which may be of any suitable form and construction, that herein shown embodying the pan form of construction common to this class of machines resting upon proper support as legs 11.

The numeral 12 denotes the frame of the machine supporting at one end a work spindle 13 bearing operating pulleys 14 and supplied with a chuck 15. This spindle and the parts thereon and connected thereto may be operated by the cam drum 16 and cam disk 17. A cross slide 18 is also mounted upon this support, this slide bearing tools of any suitable construction and operated as by means of a cam disk 19. The cams and cam drum are supported by a main cam shaft 20 mounted in the frame and driven as by means of a gear 21 suitably connected through a shaft 22, having a suitable intermeshing gear, and gears 23, 24 with a shaft 25, the latter bearing a bevel gear 26 in mesh with a bevel gear 27 on a driving shaft 28 bearing suitable means as a pulley 29 for receiving power. The train of gears affords a means of driving the machine at a certain rate of speed, a different rate being provided by a change speed gear C located at the opposite side of the machine, as shown in dotted outline in Fig. 1.

All of the parts above described are of usual form and construction and further and detailed description is therefore deemed unnecessary herein, as a complete and thorough understanding may be had from that above given by those skilled in the art.

A pinion 30 on the driving shaft meshes with a gear 31 loosely mounted on a turret driving shaft 32. A clutch 33 engages and disengages the gear from the shaft to timely operate the latter, and a turret driving plate 34 is secured to the shaft and constructed to engage and timely operate the turret by means of pins 35 engaging slots in the periphery of a plate secured to the turret and in a manner common to machines of this class. This mechanism forming no part of the invention claimed herein further and detailed description is deemed unnecessary, as the operation will be readily understood by those skilled in the art. Briefly stated, cams arranged in the usual manner upon a cam disk 36 are employed to timely shift the clutch 33, and cams also arranged in a well-known manner upon the disk 37 timely operate the clutch mechanism 38 to connect and disconnect the gear 24 and the main driving shaft 28, thus controlling the operative connection through the gears 23 and 24 between the shaft 28 and the cam shaft 20.

A spindle operating gear 39 is secured to the cam shaft 20 and meshes with a pinion 40 on an intermediate cam shaft 41. This intermediate cam shaft is mounted upon the frame of the machine in any suitable manner and is provided mainly for the support and operation of the cam drum 42.

Bearings 43 are formed in the frame of the machine for a turret that includes heads 44, 46 rotatably mounted in the bearing and having a web 45 to which the heads 44, 46 are attached.

Tool holders or spindles 47 are mounted in the turret heads for longitudinal reciprocation, keys or like means 48 preventing rotary movement of the spindles within their bearings. A collar 49 constituting a movable or operated member is mounted on each spindle and may be secured thereto as by set screws 50. Each of these collars bears contact members or pins 51. The pins in each collar are each of a length different from that of other pins in the same collar and each collar may be provided with any desired number of pins suitable to the special work for which the machine may be arranged. A spring support 53 is also mounted on each spindle, this support being in the form of a collar secured to the spindle and supporting a spring 54 secured at its opposite end to the head 46.

An indexing plate 55 is secured to the head 46, this plate bearing slots (not shown) to receive the pins 35 for the purpose of rotating the turret to bring the tool holders or spindles into proper position to operate upon the work held by the chuck or work holder upon the spindle 13. Caps 56 are secured to the indexing plate, these caps bearing adjusting screws 57 having handwheels or like means 58 for rotating the screws to properly position the spindles when adjusting the collars thereon.

A locking bolt 59 timely operated by a cam 60 on the turret driving shaft 32 is employed for locking the turret against movement, the bolt being withdrawn at proper intervals to allow the turret to be moved by the pins 35 in the plate 34. A spring 61 is employed to assist in returning the locking bolt to position to lock the turret against movement.

The locking bolt and appurtenant parts above described as well as the spring 54 have been omitted from Fig. 1 in order not to obscure other parts The cam drum 42 has a number of tool holder or spindle operating cams or movers 62. These cams are each of different pitch and are located preferably in the same circumferential line about the drum and all terminate at the same point 63. These cams are each of different height, as shown in Fig. 4 of the drawings, the height of these cams being governed by the length of the pins 51 in the collars 49 on the work holders or spindles. It will be seen from this construction that each tool holder or spindle may be moved by either of the cams 62 simply by rotating the collars 49 to bring the proper pin designed for operation with a certain cam into position to contact with said cam in the rotation of the drum. It will further be seen that this construction whereby a spindle is moved by a plural number of cams, these cams being of different pitch, enables the spindle or tool holder to be moved at different rates of speed, although the cam drum be traveling at the same working speed, and by "working speed" is meant that speed employed while a tool in a tool holder is engaged and working upon a blank or piece of work. It will further be seen from this construction, the cams all terminating at the point 63, that each tool holder or spindle will be moved up to the same position with reference to the work holder, by each of the cams 62. This provides means whereby different working speeds may be provided for each tool holder or spindle without requiring the adjustment of parts to determine the amount of such movement, as the position of the collars longitudinally of the tool holders being once determined, as by the spring supports 53, it will be assured when the collar is turned thereafter to bring a pin 51 into position to be fed at a certain speed by either of the cams, that such spindle will be fed to the same point as that to which it had been fed by one of the other cams. The stop screws 57 are for the purpose of changing the relative position of a spindle with respect to its collar, in adjusting such parts for the purpose of determining the position at which the tool borne by the spindle will end its work. In the majority of instances the collars 49 act as stops in the backward movement of the spindles, and by adjusting the spindle in the collar the zone of movement of each spindle is changed, the extent of the zone of movement, however, in ordinary instances being the same. If, however, a cam engages the pin on the collar and starts to advance the spindle before the tool in the latter actually begins to cut, the machine is kept at its fast motion until the tool is advanced to its cutting position. The spindles may, if desired, be adjusted as shown by the top spindle in Fig. 2 of the drawings so that a cam will not engage a pin at the beginning of the cam, in which case the extent of the zone of movement of the spindle would be changed, but ordinarily nothing would be gained by such adjustment. This enables the cam shaft 22, and hence the machine in general, to be operated at the faster speed for the maximum length of time, the machine being placed upon the slow speed only while the tools carried by the tool holders are operating upon a piece of work. It will thus be seen that the working or feeding speed of the turret cam drum 42 (the slower speed of the machine) is constant, while the variation in the working or feeding speed of a tool is obtained by the arrangement of cams of different pitch upon the cam drum.

It is a fact well known to those acquainted with the operations of machines of this class that in the ordinary way of changing the position of a cam to alter the operative position of a tool much care and time is required, as the cam cannot be accurately placed without trial to determine when it is in the right position, and often many trials are required before the cam is properly positioned. By the apparatus herein described the cam is not changed nor is the part upon which the cam operates changed, but the tool is changed with respect to the cams. Likewise, if a different rate of movement is desired to be imparted to a spindle to cause a faster or slower cut of the tool, this is effected without changing the cam and therefore without the trouble and loss of time incident to such operation.

The invention contemplates various changes in the mechanism herein illustrated and described as within the intent and scope of the invention, and I do not therefore limit the invention and the scope of the following claims to the foregoing illustration and description of the preferred form in which it has been embodied. While the cams have been shown herein adapted to the production of different speeds, they may be constructed to impart other kinds of variable movement one from another and yet be within the limits of the invention.

I claim—

1. A work holder, a tool holder, a cam drum, cams arranged on the drum, any cam being located to place said holders in coöperative relation once only at each complete rotation of the drum, and means for selectively connecting the cams with one of said holders to effect said operation.

2. A work holder, a plural number of tool holders, a cam drum, cams arranged on the drum, any cam being located to place any one of said tool holders in coöperative relation with the work holder once only at each complete rotation of the drum, and means for connecting the cams with holders to effect said operation.

3. A work holder, a plural number of tool holders, a cam drum, cams arranged on the drum, any cam being located to place a plural number of said tool holders successively in coöperative relation, and means for connecting the cams, without change thereof, with the holders to effect said operation.

4. A work holder, a tool holder for a tool, a variable feeding member with means for operating it, means on said feeding member to position said holders in coöperative relation, a contact member to engage said moving means on the feeding member, means for changing the relative position of said contact member and the holder operated thereby to impart variable feeds to the latter while maintaining the relative position of said moving means and the operated part or holder, and means for retaining the holder in position while changing that of said contact member.

5. A work holder, a tool holder for a tool, a variable tool holder feeding member with means for operating it, means on said feeding member to feed the holder, a contact member for the tool holder, means for changing the relative position of the contact member and tool holder to impart variable feed to the latter while maintaining the relative position of said moving means and operated part or holder, and means for retaining the position of the tool holder while changing that of the contact member thereon.

6. A work holder, a tool holder for a tool, a feeding member with means for operating it, means on said feeding member to move said holders into coöperative relation at different rates of speed, a contact member to engage said moving means on the feeding member, means for changing the relative position of said contact member and the member operated thereby to impart variable feeds to the latter while maintaining the relative positions of said moving means and operated part or holder, and means for retaining the holder in position while changing that of the contact member thereon.

7. A work holder, a tool holder for a tool, a feeding member with means for operating it, means on said feeding member to position said holders in coöperative relation, a contact member to engage said moving means on the feeding member, and means for changing the relative position of said contact member and the part operated thereby to impart variable feeds to the latter and while maintaining the relative positions of said moving means and operated part or holder, said feeding member completing a movement at each complete movement of said holders.

8. A work holder, a tool holder for a tool, a tool holder feeding member with means for operating it, means on said feeding member to feed the tool holder, a contact member for the tool holder, and means for changing the relative positions of the contact member and the tool holder to impart variable feeds to the latter and while maintaining the relative positions of said moving means and said tool holder, said feeding member completing a movement at each complete movement of said tool holder.

9. A work holder, a tool holder for a tool, a feeding member with means for operating it, means on said feeding member to move said holders into coöperative relation at different rates of speed, a contact member to engage said moving means on the feeding member, and means for changing the relative position of said contact member and the member operated thereby to impart variable feeds to the latter and while maintaining the relative positions of said moving means and operated part or holders, said feeding member completing a movement at each complete movement of said holders.

10. A work spindle, a tool spindle, means for operating one of said parts to cause operation of the tool held by its spindle, a plurality of different speed actuators for moving said parts into operative engagement, and means for operatively connecting one of said spindles with any of said actuators independently of the other actuators, each actuator making a complete movement at every operation of the tool spindle.

11. A work spindle, a tool spindle, means for operating one of said spindles to cause operation of a tool held by the spindle, a plurality of different speed actuators for moving the tool spindle toward the work spindle, and means for operatively connecting said tool spindle with any one of said actuators independently of the others, each actuator making a complete movement to every operation of the tool spindle.

12. A work spindle with means for operating it, a tool holder and a movable member, one of which bears cams of different construction and the other pins, each adapted to operate with a certain cam, said pins being adjustably mounted to permit operation of said tool holder by any cam, a tool borne by said tool holder, and means for operating the movable member.

13. A work spindle with means for operating it, a cam drum, cams borne on the drum and arranged to impart different feeding movements to a tool holder in a direction the same as the axis of the drum and in a movement of the drum at a constant rate of speed, a tool spindle arranged in proximity to the surface of the drum, and a contact member on the spindle to be engaged by any of said cams.

14. A work spindle with means for operating it, a turret bearing tools, means for rotating the turret, a cam drum, cams on the drum arranged to impart feeding movement to one or more of the tools at variable rates of speed with the drum moving at a constant rate of speed, said drum making a complete rotation at every operation of a tool.

15. A work spindle with means for operating it, a turret bearing tools, means for operating the turret, a cam drum, means for driving the drum at a constant rate of tool working speed, cams on the drum arranged to impart different feeding speeds to any or all of the tools in said turret, said cam drum making a complete rotation at every operation of a tool, and means for operating the cam drum.

16. A work spindle with means for operating it, a tool spindle to support a tool, a cam drum, a main cam shaft adapted to operate different parts of the machine and directly connected with the drum, means for driving the main cam shaft, cams on the drum arranged to impart feeding movement to said tool spindle at different rates of speed in a movement of the drum at a constant rate, and means for effecting a complete rotation of the drum at every operation of a tool.

17. A work spindle with means for operating it, a tool spindle, a cam drum, a series of cams mounted on the drum each adapted to feed said spindle in the same zone at a different rate from another, and connections with the tool spindle to permit operation by any cam.

18. A work spindle with means for operating it, a turret bearing tool spindles, means for operating the turret, an actuating device and a series of tool spindle movers mounted on the actuating device and each adapted to feed any spindle, and connections with the tool spindles to permit operation of each by any of said tool movers.

19. A work spindle with means for operating it, a turret bearing tool spindles, means for operating the turret, a cam drum, a series of cams mounted on the drum each adapted to feed any spindle, and connections with tool spindles to permit operation of each by any of the cams.

20. A work spindle with means for operating it, a turret bearing tools, a cam drum with means for operating it, a series of cams arranged on the drum to automatically feed different tools and all terminating in a single line extending longitudinally of the turret and located in the plane of the axis thereof, and means for rotating the turret to place any of the tools in coöperative relation with the desired cam.

21. A work spindle with means for operating it, a turret bearing tool spindles, a cam drum, a series of cams arranged on the drum adapted to automatically feed different spindles, the feeding faces of all of the cams terminating on a single line located in the plane of the axis of the drum, means for operating the drum, and means for rotating the turret to place any of the tools in coöperative relation with the desired cam.

22. A work spindle with means for operating it, a turret bearing tools, a cam drum with means for operating it, a series of differently formed cams arranged on the drum to automatically feed different spindles, the returning face of said cams all terminating in a single line located in the plane of the axis of the drum, and means for rotating the turret to place any of the tools in coöperative relation with the desired cam.

23. A work spindle with means for operating it, a turret bearing tools, a cam drum bearing a series of cams to automatically feed different tools, said cams being of different pitch but arranged to impart the same amount of feeding movement to the tools, means for operating the drum, and means for rotating the turret to place any of the tools in coöperative relation with the desired cam.

24. A work spindle with means for operating it, a turret bearing tools, a cam drum bearing cams to automatically feed different tools, said cams being of different pitch with their working faces all terminating on a line in the plane of the axis of the drum, means for operating the drum, and means for rotating the turret to place any of the tools in coöperative relation with the desired cam.

25. A work spindle with means for operating it, a turret bearing tools, a cam drum with means for operating it, cams arranged on the drum to automatically feed different tools, said cams being of different pitch and all ending on a single line extending lengthwise of the drum in the plane of the axis thereof, and means for rotating the turret to place any of the tools in coöperative relation with the desired cam.

26. A work spindle with means for operating it, a turret bearing tools, a cam drum with means for operating it, cams on the drum for automatically feeding different tools, said cams being of different pitch but arranged to impart the same amount of feeding movement to each tool, and all the cams terminating on a single line extending longitudinally of the drum in the plane of the axis thereof, and means for rotating the turret to place any of the tools in coöperative relation with the desired cam.

27. A work spindle with means for operating it, a turret bearing tools, means for rotating the turret, a cam drum with means for operating it, cams on the drum arranged to feed the tools, said cams being of different pitch one from another, and connections with the tools permitting operation of any tool thereof by any cam.

28. A work spindle, a turret bearing tools, a cam drum, a series of cams mounted on the drum with the working faces all terminating in the same line lengthwise thereof, and connections for operation of all of the tools by any of said cams.

29. A work holder, a tool holder, a member movably mounted on a holder to adjust the position of contact members, a plural number of contact members borne on the movable member, and a plural number of parts for feeding the holder at variable speeds each adapted to operate upon said contact members.

30. A work holder, a tool holder, a collar rotatably adjustable upon one of said holders, pins of different lengths arranged about the collar, and a plural number of feeding means each adapted to engage one of said pins.

31. A work holder, a tool holder, a member movably mounted on a holder and having contact members of varying lengths, and a plural number of feeding members of varying heights each arranged to engage and operate upon one of said contact members.

32. A work holder, a tool holder, a member adjustably mounted upon a holder and bearing a number of contact members of different lengths, a cam drum, means for operating the drum, and cams of different heights mounted upon the drum and each arranged to engage one of said contact members.

33. A work holder, a tool holder, means for feeding a holder, and including a plural number of cams of different pitch all terminating at the same point, means for operating the cams, and connections with a holder arranged to permit operation by any cam.

34. A work holder, a tool holder, means for feeding a holder, connections between the feeding means and a holder including members of different height and pitch all terminating at the same point, and a member arranged to coöperate therewith in the feeding operation.

35. A work holder, a tool holder, means for feeding a holder, and connections between the feeding means and a holder including a plural number of parts of different length upon one member any one of which parts is adapted to coöperate with any one of a plural number of parts of different heights all terminating at the same point upon the other member.

36. A work holder, a turret with means for operating it, tool holders mounted in the turret, a member movably mounted on a holder to vary its zone of movement, means for securing the movable member, means for moving the holder independently of the movable member, and means for operating the movable member.

37. A work holder, a turret with means for operating it, tool holders mounted in the turret, a member adjustably mounted on a holder to vary its zone of movement, an adjusting screw in operative engagement with said holder, and means for operating the holder.

38. A work spindle with means for operating it, a turret bearing tools, means for rotating the turret, members movably connected with the turret to vary the zone of movement of the tools toward and away from the work spindle, a cam drum bearing cams, means for operating the drum, pins located on said movable members, and means for adjusting the position of the pins to permit operation of any tool by any cam.

39. A work spindle and a tool spindle, one of said spindles being mounted for longitudinal movement, a device movably connected with the longitudinal movable spindle to vary the zone of movement thereof, pins located on said device, means for adjusting said device with respect to the position of said pins, means for holding said device while adjusting the position of the spindle therein, and an actuator bearing a plural number of variable speed movers arranged to engage with said pins to effect movement of the spindle bearing the pins by any of said movers.

40. A work spindle, a tool spindle, means for placing said spindle in coöperative relation, a device movably connected with one of said spindles, means for movably adjusting said device with respect to the last mentioned spindle to vary the zone of movement of said spindle, and means for retaining the position of said spindle while moving said device.

41. Tool feeding mechanism including a turret with means for rotating it, spindles longitudinally movable in the turret, collars secured to the spindles, contact members mounted upon each collar, means for adjusting the contact members on a collar to coöperate with any desired one of a plural number of operating devices, and a plural number of devices for operating the contact members.

42. Tool feed mechanism including a turret with means for operating it, spindles movable longitudinally within the turret, collars adjustably mounted on the spindles, contact means mounted on each collar, a series of cams for operating upon the collars to impart variable speeds to the spindles, and means for supporting and operating said cams.

43. A feed mechanism including a turret with means for operating it, spindles movable longitudinally in the turret, collars mounted on the spindles, each collar bearing contact members, a series of cams each adapted to operate a plural number of collars, means for supporting and operating the cams, and means for adjusting the contact members to coöperate with said cams.

44. A feeding mechanism including a turret, means for rotating it, spindles mounted for longitudinal movement in the turret, collars adjustably mounted on the spindles, a series of cams for operating the spindles, and connections between the cams and collars to cause a movement of each spindle by any cam.

45. A feeding mechanism including a turret with means for operating it, spindles longitudinally movable in the turret, a collar adjustably supported on each spindle, a plural number of contact pins located on each collar to effect variable movement thereof, and means engaging the pins to reciprocate the spindles.

46. A work holder, a tool holder, means including a plural number of parts for operating a holder, and a collar bearing a number of contact members to effect variable movement of said collars, said contact members being arranged to be engaged by any one of a plural number of said operating parts without change of position of the collar longitudinally of the holder.

WALTER B. PEARSON.

Witnesses:
GEORGE E. WITHERELL,
ERNEST R. SEWARD.

Copies of this patent may be obtained for five cents each, by addressing the "Commissioner of Patents, Washington, D. C."